United States Patent [19]

Lentz

[11] Patent Number: 5,444,853
[45] Date of Patent: Aug. 22, 1995

[54] SYSTEM AND METHOD FOR TRANSFERRING DATA BETWEEN A PLURALITY OF VIRTUAL FIFO'S AND A PERIPHERAL VIA A HARDWARE FIFO AND SELECTIVELY UPDATING CONTROL INFORMATION ASSOCIATED WITH THE VIRTUAL FIFO'S

[75] Inventor: Derek J. Lentz, Los Gatos, Calif.

[73] Assignee: Seiko Epson Corporation, Tokyo, Japan

[21] Appl. No.: 862,623

[22] Filed: Mar. 31, 1992

[51] Int. Cl.$^6$ .................... G06F 13/12; G06F 13/14
[52] U.S. Cl. .................... 395/250; 395/425; 395/842; 364/238.6; 364/238.9; 364/239.7; 364/DIG. 1; 364/255.8; 364/255.1
[58] Field of Search .................... 395/250, 500, 200

[56] References Cited

U.S. PATENT DOCUMENTS

| 4,831,523 | 5/1989 | Lewis et al. | 364/200 |
|---|---|---|---|
| 4,881,167 | 11/1989 | Sasaki et al. | 364/200 |
| 4,928,247 | 5/1990 | Doyle et al. | |
| 4,949,301 | 8/1990 | Joshi et al. | 364/900 |
| 5,043,981 | 8/1991 | Firoozmand et al. | 370/85.1 |
| 5,046,023 | 9/1991 | Katsura et al. | 364/518 |
| 5,050,066 | 9/1991 | Myers et al. | 364/200 |
| 5,133,062 | 7/1992 | Joshi et al. | 395/500 |
| 5,136,582 | 8/1992 | Firoozmand | 370/85.1 |
| 5,210,749 | 5/1993 | Firoozmand | 370/85.1 |
| 5,247,626 | 9/1993 | Firoozmand | 395/250 |

FOREIGN PATENT DOCUMENTS 0208430 1/1987 European Pat. Off. .
0442716 8/1991 European Pat. Off. .

OTHER PUBLICATIONS

Patent Abstracts of Japan, vol. 011, No. 203, (P591), Jul. 2, 1987, and JP 62025360, (NEC), Feb. 3, 1987.

Patent Abstracts of Japan, vol. 014, No. 560, (E-1012), Dec. 13, 1990, and JP 2241191, (NEC), Sep. 25, 1990.

John L. Hennessy and David A. Patterson, Computer Architecture—A Quantitative Approach; Morgan Kaufman Publishers, Inc.; Palo Alto, Calif. 1990; Chapter 9; pp. 498–569.

Primary Examiner—Thomas C. Lee
Assistant Examiner—Le Hien Luu
Attorney, Agent, or Firm—Sterne, Kessler, Goldstein & Fox

[57] ABSTRACT

A system and method for queuing, control and transfer of data between a host processor and a peripheral processor using an architecture and a data flow strategy of one or more virtual FIFO data structures stored in main memory and a hardware FIFO under control of the host and peripheral processors. One virtual FIFO at a time drives the data FIFO with data. In turn, the data FIFO drives a peripheral device with this data. The host software running on the digital processor controls the loading of data for each process (context) into its associated virtual FIFO. The host processor controls the operation of the peripheral processor and the virtual FIFOs. The peripheral processor controls the flow of data from the data FIFO to the peripheral device, and under control of the host software, the flow of data from the driving virtual FIFO to the data FIFO. Start and end address pointers for each virtual FIFO stored in associated memory block indicate the memory location in the virtual FIFO where data is stored. The peripheral processor also keeps a start address pointer of the memory location of the last unused data then read out of the data FIFO to the peripheral device. These address pointers allow the hardware FIFO to be flushed when a context switch occurs, which can take place before all of the data in the driving virtual FIFO is supplied to the data FIFO, and supplied by the data FIFO to the peripheral device.

21 Claims, 14 Drawing Sheets

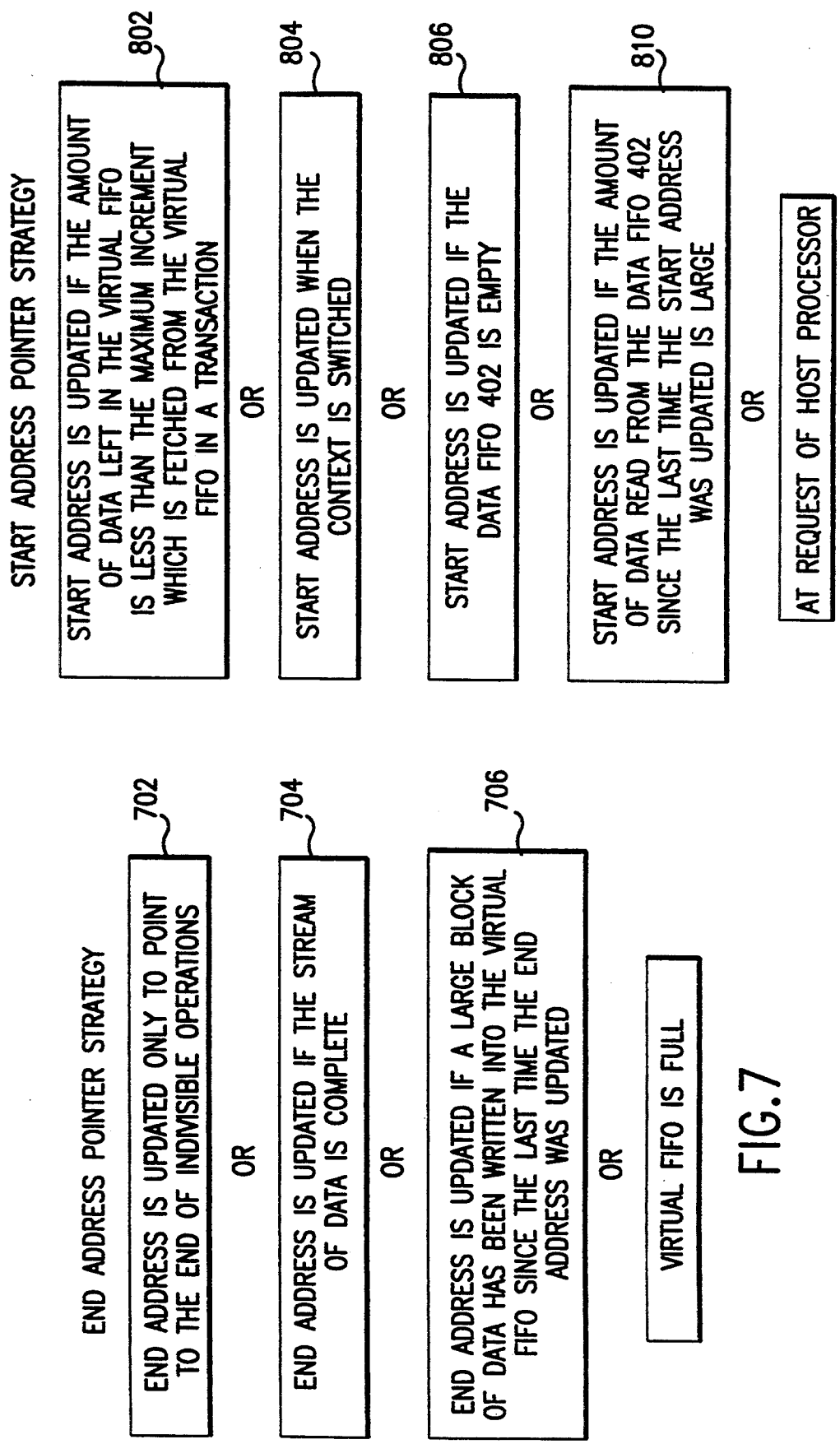

SYSTEM AND METHOD FOR TRANSFERRING DATA BETWEEN A PLURALITY OF VIRTUAL FIFO'S AND A PERIPHERAL VIA A HARDWARE FIFO AND SELECTIVELY UPDATING CONTROL INFORMATION ASSOCIATED WITH THE VIRTUAL FIFO'S

BACKGROUND OF THE INVENTION

1. Field of the Invention

The present invention relates generally to the queuing, control and transfer of data between a host processor and a peripheral processor, and more particularly, to first-in-first-out (FIFO) systems and methods between a host processor and a peripheral processor.

2. Related Art

While input/output historically has been the orphan of computer architecture, it is absolutely critical to the performance of any traditional class of computers: mainframe, minicomputer, workstation, file server, and personal computer. As stated by John L. Hennessy and David A. Patterson in their seminal book *Computer Architecture A Quantitative Approach*, Morgan Kaufmann Publishers, Inc., Palo Alto, Calif., U.S.A., 1990, p. 499 (which is incorporated herein by reference):

> A computer without I/O devices is like a car without wheels—you can't get very far without them. And while CPU time is interesting, response time—the time between when the user types a command and when she gets results—is surely a better measure of performance. The customer who pays for a computer cares about response time, even if the CPU designer doesn't. Finally, as rapid improvements in CPU performance compress traditional classes of computers, it is I/O that serves to distinguish them.

"Smart" peripheral devices have internal processing functionality. Such smart peripheral devices often require streams of instructions and data.

Referring now to FIG. 1, the architecture of conventional smart peripheral devices is shown. The streams of instructions and/or data may either be held in one or more specific data structure(s) 101 in a main memory 102, or in a separate (deep) hardware memory, which in conventional systems is usually a FIFO located in an I/O controller (such as 106, 112, or 134) associated with (or part of) the I/O or peripheral device.

In the example shown in FIG. 1, there are three so-called peripherals that are shown for purposes of illustration. The first peripheral, which is designated generally by a reference numeral 130, is made up of an input-/output (I/O) controller 106, a disk drive 104, and a disk drive 108. I/O controller 106 may or may not contain internal processing functionality in the form of a peripheral processor (CPU) or peripheral controller (not shown).

The second peripheral is designated generally by a reference numeral 132. Second peripheral 132 is made up of an I/O controller 112 and a graphics output 114, which typically is a cathode ray tube (CAT) display or a frame buffer, but can be any suitable graphics output device. Like I/O controller 106, I/O controller 112 may or may not have internal processing functionality.

The third peripheral is designated generally by a reference numeral 134. Third peripheral 134 is made up of an I/O controller 116 and a network 118. Like I/O controller 106, I/O controller 116 may or may not have internal processing functionality.

First peripheral 130, second peripheral 132, and third peripheral 134 can either receive data and instructions from digital processor 126, receive instructions from and send read data to the digital processor 126, or receive instructions from and send to and receive data from the digital processor 126.

In the conventional system and method of FIG. 1, the data and instructions are received from main memory 102 via a CPU-memory bus 122 and a bus adapter 120 to an I/O bus 110.

The architecture of FIG. 1 can also be applied to systems with multiple memory devices 101 and/or I/O buses 110.

FIG. 2 shows another conventional architecture and method, where the peripherals are connected directly to cache 124. Specifically, I/O controllers 106, 112 and 116 are connected via the I/O bus 110 and bus adapter 120 and a bus 204 to cache 124, which is connected to CPU-memory bus 122, and to CPU 126 via a translation look aside buffer (TLB) 202. Like the conventional system of FIG. 1, the streams of instructions and data for the peripherals in the system of FIG. 2 may be placed in a deep hardware buffer such as a FIFO as part of the I/O controller, or as a software data structure stored in main memory 102.

A conventional system and method for transferring data between a digital processor and a peripheral processor utilizing virtual direct memory access (DMA) is shown in block architectural form in FIG. 3. The virtual DMA requires a register for each page to be transferred in a DMA controller 302, showing the protection bits and the physical page corresponding to each virtual page. Address-translation registers 304 connect DMA 302 to CPU-memory bus 122.

Note that the architecture in FIG. 3 (and for that matter FIGS. 1 and 2) can also be implemented without an I/O bus 110. The peripheral could be directly connected to DMA 302, and in turn, directly connected to CPU-memory bus 122. The architectures shown in FIGS. 1, 2, and 3 are illustrative only, and are not intended to represent a detailed discussion of computer architectures in general.

Regardless of whether the instructions and/or whether the streams of instructions and data are held in the software FIFO data structure 101 of main memory 102, or are placed in a hardware FIFO buffer, there is a trade-off as to the depth of the FIFO of these conventional systems. The software specific data structure approach is slow since the streams of instructions and data must be sent over CPU-memory bus 122 via bus adapter 120 to I/O bus 110.

The hardware FIFO buffer approach is faster. However, a deep hardware FIFO is expensive, especially in a computer system using a high clock rate. As is well-known, higher clock rates are constantly being used for the host processor 126 to improve system performance and increase system functionality.

Regardless of which of the conventional systems of FIGS. 1, 2 and 3 is used for the instruction and data path between the digital processor (CPU) 126 and the peripheral processors found in the I/O controllers 106, 112, and 116, some type of FIFO system must be used, either the specific data structure(s) 101 stored in main memory 102 or a deep hardware FIFO buffer.

To reduce latency, it is advantageous that as much of the instructions and data that will be needed by the peripheral processor be present in the FIFO. Thus, a conventional strategy for reducing latency is to create a larger (also called a "deeper") FIFO.

However, the use of a deeper FIFO approach means that more instructions and/or data must be dealt with before the stream of instructions and/or data can be switched to another stream of instructions and/or data. Such a switch in the streams of instructions and data is called a "context switch." In other words, all of the instructions and/or data in the FIFO must be dealt with by the I/O controller 106, 112, 116 before the stream of instructions and/or data being provided to the I/O controller 106, 112 or 116 is context switched. This has the effect of increasing latency because of the extra time that is taken before the context switch can take place between streams of instructions and/or data.

One conventional approach for reducing latency is to make the FIFO shallow. This means that less instructions and/or data must be dealt with before the stream of instructions and/or data can be context switched. However, the use of a shallow FIFO means that the FIFO must be serviced more often. This increased servicing consumes additional bandwidth and CPU overhead (for checking the state of the FIFO), which is not desirable.

Thus, it would be advantageous to provide a system and method whereby the streams of instructions and/or data between a digital processor and a peripheral processor can be context switched quickly, is inexpensive to implement, minimizes impact on system latency, and reduces memory bandwidth requirements.

SUMMARY OF THE INVENTION

The present invention is a system and method which utilizes a shallow hardware FIFO along with system memory to reduce the cost of the FIFO hardware, to allow relatively fast context switches, and to decrease latency and memory bandwidth requirements.

In broad terms, the present invention is a system and method for queuing, control and transfer of data between a host processor and a peripheral processor using an architecture and a data flow strategy of one or more virtual FIFO data structures stored in main memory and a hardware data FIFO (which typically is physically located on the same chip or circuit board with the peripheral processor) under control of the peripheral processor. One virtual FIFO at a time drives the data FIFO with data. In turn, the data FIFO drives a peripheral device with this data. As employed herein the term "drives" is used to mean supplying data to a device. Thus driving the data FIFO means supplying or passing data to the data FIFO.

The host software running on the digital processor controls the loading of data for each process (context) into its associated virtual FIFO. The digital processor under control of the host software and system software (or firmware) controls the operation of the peripheral processor and the virtual FIFOs. The peripheral processor controls the flow of data from the data FIFO to the peripheral device, and under control of the host software, the flow of data from the driving virtual FIFO to the data FIFO.

Start and end address pointers for each virtual FIFO (stored in main memory in an associated memory block) indicate the memory location in the virtual FIFO where data is stored. The peripheral processor also keeps a start address pointer of the memory location of the last unused data then read out of the data FIFO to the peripheral device.

These address pointers allow the hardware FIFO to be flushed when a context switch occurs, which can (and usually does) take place before all of the data in the driving virtual FIFO is supplied to the data FIFO, and supplied by the data FIFO to the peripheral device. A strategy for updating the address pointers improves effective memory bandwidth.

The present invention allows for main memory latency, reduces main memory bandwidth utilization, allows for relatively fast context switching, and reduces hardware cost because the storage capacity of the (hardware) data FIFO is small relative to the storage capacity of each virtual FIFO. Total storage capacity of each virtual FIFO, data FIFO combination is large, with the added benefit that the hardware data FIFO can be fast, which reduces latency. Moreover, context switching is relatively fast because it can be done by changing address pointers and by dumping the contents of the hardware FIFO.

BRIEF DESCRIPTION OF THE DRAWINGS

The present invention is better understood with reference to the following drawings and the specification.

FIG. 5 is made up of FIGS. 5A and 5B.

FIG. 7 is a block diagram showing the end address pointer strategy used for updating (or not updating) the end address pointer in order to save bandwidth in both writing and reading of the end address pointer.

FIG. 8 is a block diagram showing the start address pointer strategy used for updating (or not updating) the start address pointer in order to save bandwidth in both writing and reading of the start address pointer.

DETAILED DESCRIPTION OF THE PREFERRED EMBODIMENTS

A. General Overview and Terminology

Figure 1:
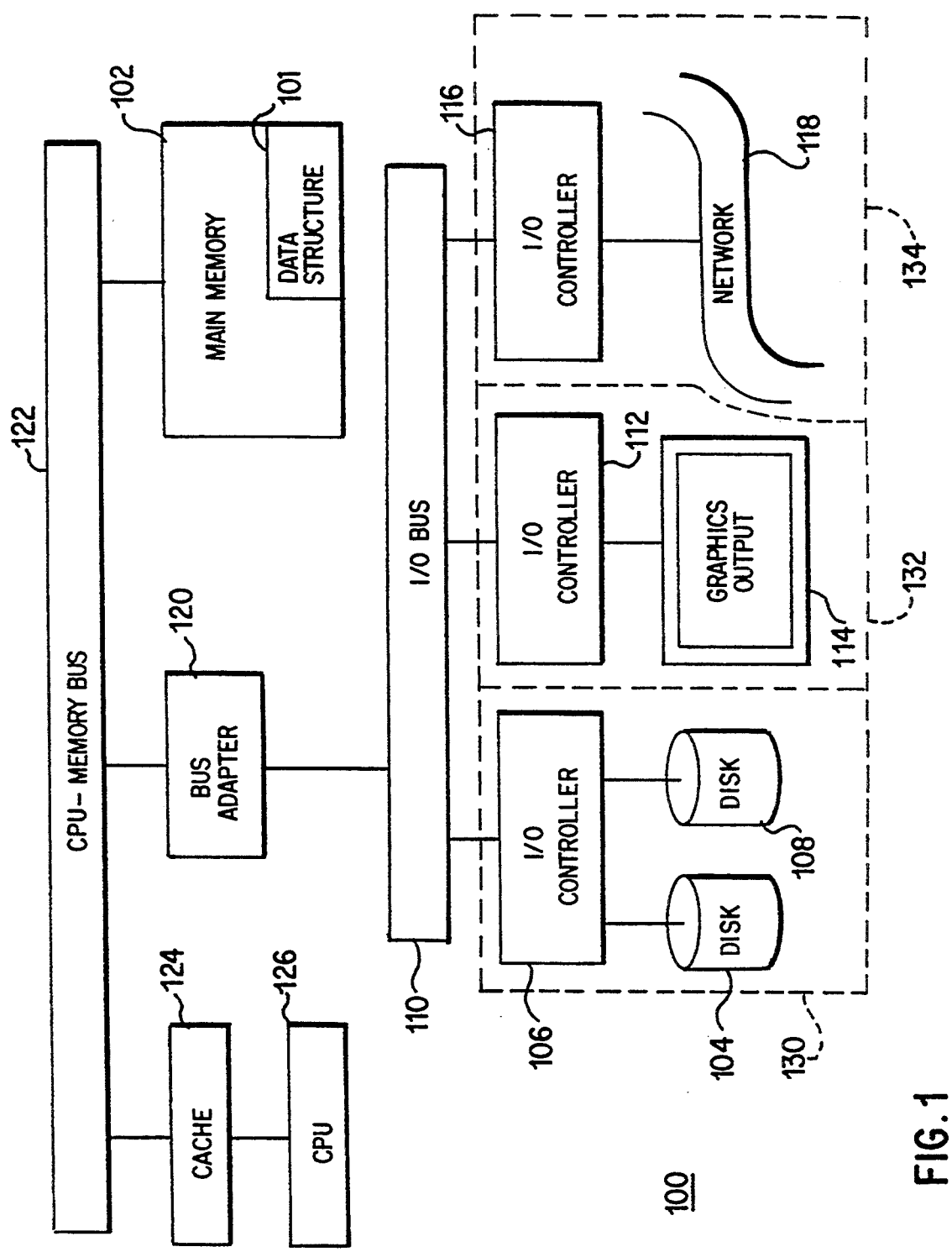
FIG. 1 is a block architectural diagram of a conventional interface of I/O devices and an I/O bus with a CPU-memory bus.

The terms host processor, host CPU, digital processor, master CPU and CPU are often used interchangeably in this field. The term "host processor" is used hereafter with the understanding that other similar terms could be substituted therefor without changing the underlying meaning of the disclosure.

The terms chip, integrated circuit, monolithic device, semiconductor device and microelectronic device are often used interchangeably in this field. The present invention is applicable to all of the above as they are generally understood in the field.

The numbering convention is as follows. The right two digits indicate the item number. The left digit or digits indicate the Figure where the item first appears. The same number in each Figure indicates the identical item. Wherever possible, the Figures are discussed in numerical order in the text.

In broad terms, the present invention is a system and method for queuing, control and transfer of data between a digital processor and a peripheral processor using an architecture and a data flow strategy of one or more virtual FIFO data structures stored in main memory and a hardware FIFO (which typically is physically located on the same chip or circuit board with the peripheral processor) under control of the peripheral processor. One virtual FIFO at a time drives the hardware FIFO with data. In turn, the hardware FIFO drives a peripheral device with this data. The host software running on the digital processor controls the loading of data for each process (context) into its associated virtual FIFO. The host processor under control of the host software controls the operation of the peripheral processor and the virtual FIFOs. The peripheral processor controls the flow of data from the hardware FIFO to the peripheral device, and under control of the host software, the flow of data from the driving virtual FIFO to the hardware FIFO.

As employed herein the term "context" is defined as the current state of a processor. In a CPU the context of that processor would be, for example, the contents of the register files, contents of the status registers, and the current state of the error flags. In the case of a smart peripheral the context attributes might include any attributes that have been set and at what point in its pipeline those attributes have been set. Thus, context switching entails switching the states of the different processes currently running on the computer system employing the present invention. In other words, the states of one process are saved and switched with the states of another process inside the driving virtual FIFO.

For illustration purposes, consider a workstation that has a number of windows currently opened. Each window has its own context. Thus, when the user wants to switch between windows the workstation must save the context associated with the first window and switch to the context of the second window.

As indicated above, control and transfer of data between a digital processor and a peripheral processor can be accomplished with only one virtual FIFO for all processes. Moreover, the present invention can be implemented with one virtual FIFO assigned to multiple processes. The hardware configuration of the present invention does not restrict the use of one virtual FIFO.

Start and end address pointers for each virtual FIFO (stored in main memory in an associated control block) indicate the memory location in the virtual FIFO where information is stored. The peripheral processor also keeps a start address pointer of the memory location of the last unused data read out of the hardware FIFO to the peripheral device. These address pointers allow the driving virtual FIFO to be flushed when a context switch occurs, which can take place before all of the data in the driving virtual FIFO is supplied to the hardware FIFO, and supplied by the hardware FIFO to the peripheral device. A strategy for updating the address pointers improves system efficiency.

The present invention allows for the latency associated with main memory, reduces main memory bandwidth utilization, allows for relatively fast context switching, and reduces hardware cost because the storage capacity of the hardware FIFO is small relative to the storage capacity of each virtual FIFO. Total storage capacity of each virtual FIFO, hardware FIFO combination is large, and the hardware FIFO can be fast, which reduces latency. Context switching is relatively fast because it can be done by changing pointers and by dumping the contents of the hardware FIFO.

The present invention is envisioned as being included in a very large scale integrated (VLSI) graphics processor (of the type used with the second peripheral 132). However, it should be understood that the present invention can be used in many other applications as well.

Figure 4:
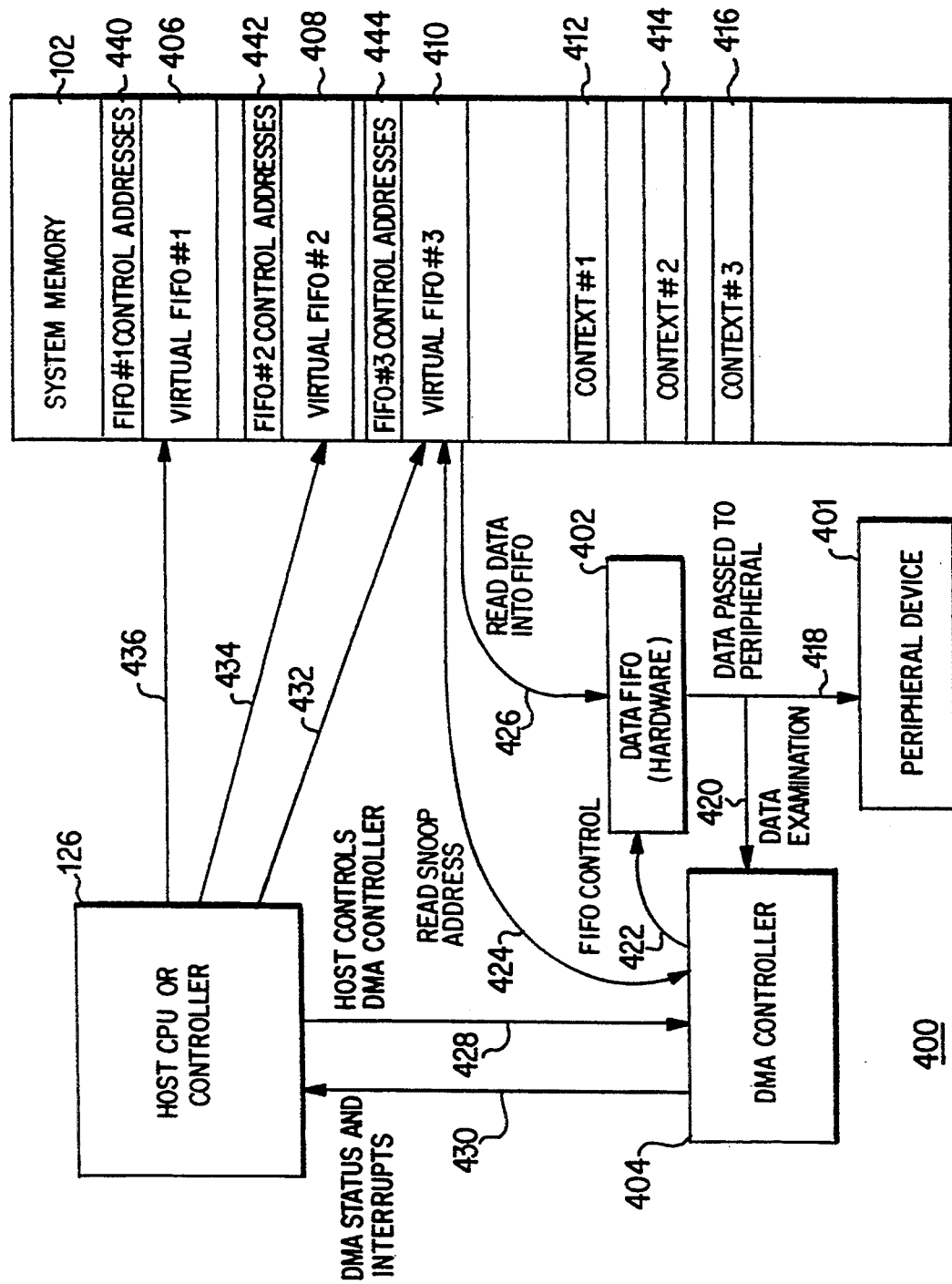
FIG. 4 is a block diagram showing at a high level the data flow and control paths of the present invention.

Referring now to FIG. 4, which is a block diagram showing the control and data flow of the present invention. Main memory 102 includes a set of queues known as virtual FIFOs. Three virtual FIFOs are shown for purposes of illustration: they are virtual FIFO(1), which is referred to by reference number 406; a virtual FIFO(2), which is referred to by reference number 408; and a virtual FIFO(3), which is referred to by reference number 410. It should be understood that the present invention contemplates one or more virtual FIFOs located in main memory 102.

The virtual FIFOs located in main memory 102 are used to drive a peripheral device, referred to generally by a reference number 401. This driving by the data from the virtual FIFO in question takes place through a hardware FIFO 402. It should be noted that the virtual FIFO's can be incorporated into any dedicated memory (e.g., a 2-port memory on an I/O card).

Any type of peripheral device 401 can be used by the present invention. In the preferred embodiment, the peripheral device is a graphics processor having a frame buffer (not shown). Alternately, the peripheral device 401 could be a disk drive 104, or a network 118, or any other output device.

Figure 2:
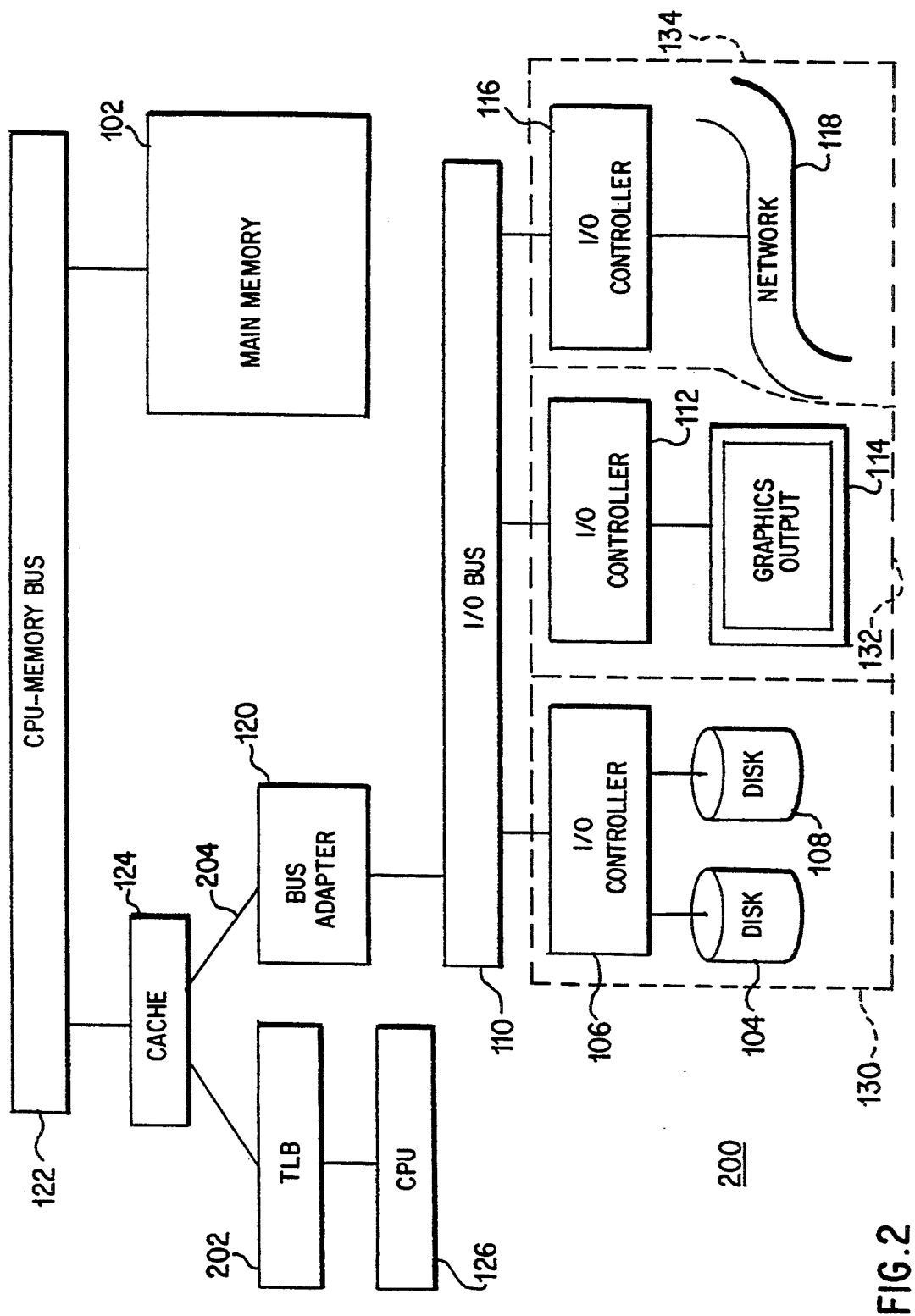
FIG. 2 is a block diagram of a conventional interface of the I/O connected directly to the cache.
Figure 3:
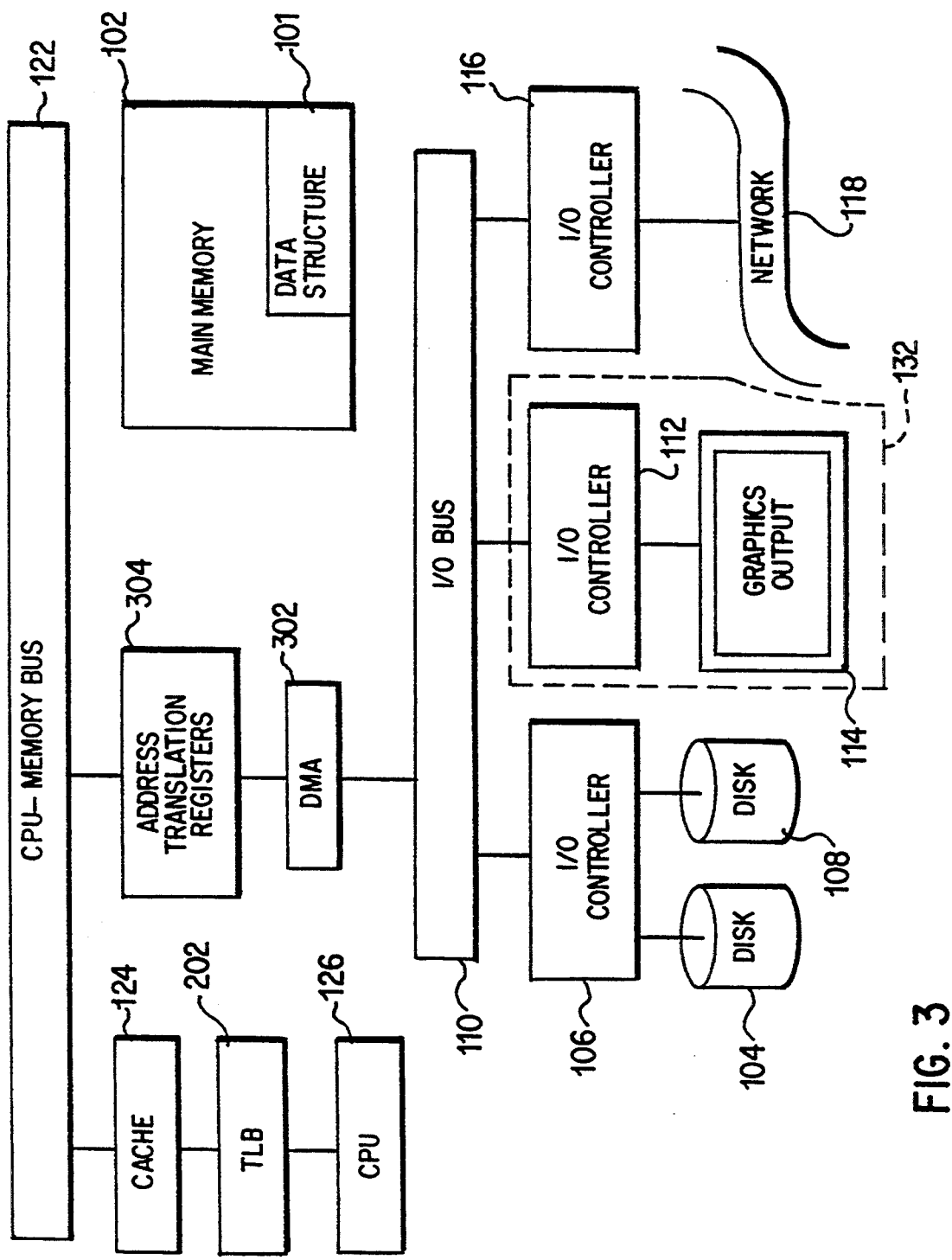
FIG. 3 shows in block architectural form a conventional digital processor and peripheral processor system having virtual direct memory access, which requires a register for each page to be transferred in the DMA controller.

The DMA controller is part of peripheral subsystem 132. It may or may not have internal processing functionality. It should be noted that DMA controller 404 may be part of peripheral 132 (as shown in FIGS. 1, 2, and 3) or may be a separate peripheral device.

DMA controller 404 is under the control of software (not shown) or firmware (not shown) running on the host processor 126. The software or firmware control allows host processor 126 to efficiently provide data and instructions to peripheral device 401 in accordance with the present invention. This control is via a path 428 effectively between host processor 126 and DMA controller 404. This path will depend upon the architecture of the system, such as those shown in FIGS. 1, 2 and 3.

Data FIFO 402 is the hardware FIFO referred to above. Data FIFO 402 is typically part of peripheral 132. It can be a separate hardware FIFO made up of one or more integrated circuits (ICs), which are part of the board including I/O controller 112. In its preferred form, hardware FIFO 402 is a modest sized on-chip hardware data FIFO, which is part of the VLSI graphics processor (not shown). Any conventional fabrication process can be used for building hardware FIFO 402 either separately on a chip, or as part of a larger chip having additional subsystems and functionality. The size of the hardware FIFO depends on a variety of system criteria. For example, if the hardware FIFO was 16 words (4 bytes each) deep, then the virtual FIFO's should be 512 bytes, which should be adequate for lower performance 2D applications. For more complex 3D operations the virtual FIFO's could be, for example, 8K bytes. In addition, hardware FIFO 402 in a preferred embodiment holds two of the largest divisible operations capable of being performed by peripheral 401. However, the exact constraints of hardware FIFO 402 depend on the latency of main memory.

At any time in the operation of the present invention, only one of virtual FIFOs 406, 408 or 410 is used to drive peripheral device 401 using hardware FIFO 402. For a given hardware FIFO 402, the host processor can "compute ahead" and generate data for large virtual FIFO without waiting until it actually has access to the hardware. Moreover, the host processor need not "poll" the pointers constantly to know if it has the necessary space. Thus, two very significant advantages are achieved by the system and method of the present invention: a reduction in latency, and a minimization of hardware in the use of the bandwidth of main memory 102.

The example of the present invention shown in FIG. 4 has a DMA controller 404. It should be understood that this representative example of the present invention envisions a larger host processor and peripheral processor architecture of the type shown in FIG. 3. Specifically, referring again to FIG. 3, DMA controller 404 would be a combination of I/O controller 112, and DMA 302 and the address-translation registers 304.

Figure 14:
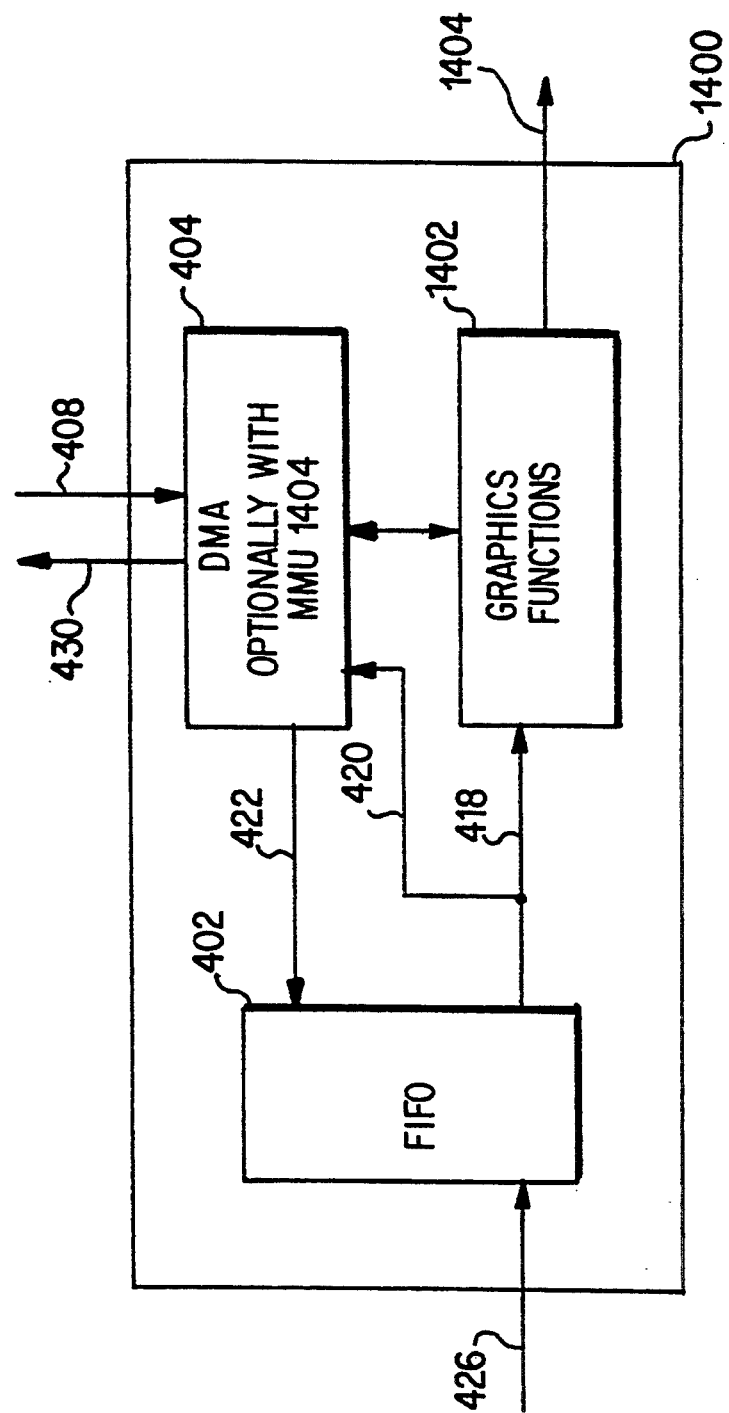
FIG. 14 is a block diagram of an embodiment of the present invention where the hardware FIFO 402, DMA controller 404, and graphics function stage 1402 are all physically part of a peripheral 1400.

FIG. 14 shows a block diagram of an embodiment of the present invention. A peripheral 1400 includes hardware FIFO 402, DMA controller 404, and a graphics functions stage 1402, all of which are physically part of the peripheral 1400. Note that DMA can optionally include a virtual memory management unit (VMU) 1404, if desired. Also note that all of these components can be physically located on the same chip as the CPU.

The present invention is also equally applicable to the architectures shown in FIGS. 1 and 2. Specifically, DMA controller 404 with reference to the architecture shown in FIG. 1 could be part of the I/O controller 112, so that the data that is supplied by host processor 126 would come from the main memory 102 via CPU-memory bus 122, bus adaptor 120, and I/O bus 110.

Alternately, the present invention could utilize the architecture of FIG. 2. Specifically, DMA controller 404 could be part of I/O controller 112. The data from main memory 102 could be supplied by bus adaptor 120 and I/O bus 110.

What should now be appreciated is that the present invention can be utilized with any of the computer architectures shown in FIGS. 1, 2 and 3. The present invention could also be utilized with any other computer architecture which would permit the use of virtual FIFOs in a system memory 102 or special I/O memory.

Referring now to FIGS. 3 and 4, it should be understood that DMA controller 404 may also include a virtual memory management unit (VMU; not shown), if desired.

Referring now to FIG. 4, DMA controller 404 reads the (software) virtual FIFO that is being used to drive hardware FIFO 402. DMA controller 404 passes commands and data from the virtual FIFO that is driving hardware FIFO 402 so that the commands and data are received by peripheral device 401. Moreover, DMA controller 404 provides status information and interrupts via a path 430 between it and host processor 126. Path 430 on a physical level will depend upon the computer architecture of the types as shown in FIGS. 1, 2 and 3 that is used.

One of the important aspects of the present invention is that the queues contained in virtual FIFOs 406, 408 and 410 can be switched when the peripheral context is switched. The ability to switch between two or more contexts in a peripheral is becoming increasingly important as the functionality of the computer system and the peripheral increase. For example, windowing systems used in graphics processors will include two or more contexts. In other words, each window that is present in the peripheral is a separate context. The present invention can easily accommodate the context switching so that it is done relatively fast and efficiently.

The context switching or "swaps" of the present invention are under control of higher level software that is operating on the digital processor 126. Any application which requires a smart peripheral which is programmed with software has the potential of passing data, and thus, would benefit from the present invention. An example of such an application would be window system software.

B. Memory Address Snooping

Referring again to FIG. 4, each virtual FIFOs 406, 408 and 410 has an associated FIFO control block. Specifically, virtual FIFO 406 has a FIFO control block 440, virtual FIFO 408 has a FIFO control block 442, and virtual FIFO 410 has a FIFO control block 444. The control blocks 440, 442 and 444 are located in main memory 102, but could also be located in any available memory location in the host processor system.

As is discussed in greater detail below, host processor 126 (or any other processor that is controlling the peripheral device 404; not shown) periodically writes to the memory control block of the virtual FIFO that is being used to drive the peripheral device 401.

DMA controller 404 snoops these accesses to the memory blocks by digital processor 126. The word snoop is synonymous with the word monitor. This snooping by DMA controller 404 occurs via a path 424 (labeled "read/snoop address").

When DMA controller 404 detects that host processor 126 has written to the control block of the virtual FIFO that is driving peripheral device 401, DMA controller 404 updates the end address, as discussed below.

Snooping is not required if the host processor writes directly into DMA 404 registers, as opposed to writing into the virtual FIFO's control block. In addition, snooping can also be disabled if data is written directly into hardware FIFO 402 by the host processor.

C. Virtual FIFOs

Figure 5A:
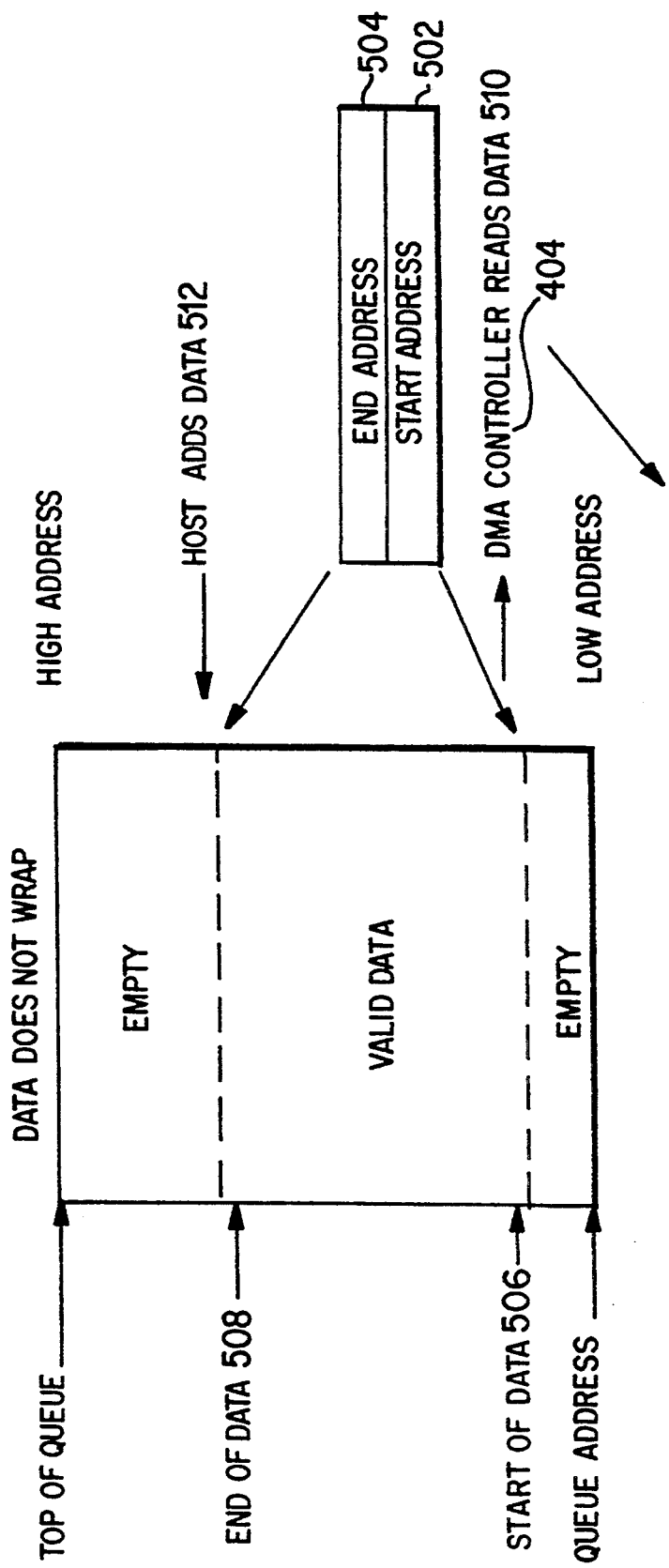
FIG. 5A shows a preferred virtual FIFO data structure in accordance with the present invention where data does not wrap.

FIG. 5 illustrates a preferred virtual FIFO 406, 408, 410 data structure in accordance with the present invention. FIG. 6 is a flow chart which shows at a high level the control of the data queues (virtual FIFOs 406, 408 and 410). Once again note that DMA controller 404 and the software running on host processor 126 jointly control the virtual FIFOs (data queues) 406, 408 and 410 (shown in FIG. 4).

Specifically, as indicated in block 602, the host software (not shown) running on host processor 126 sets up (i.e., initializes) the data queue (virtual FIFO) driving peripheral device 401, as indicated by a step 604. Next, the host software sets up DMA controller 404, as indicated by a step 606.

In a step 608, the host software instructs DMA controller 404 to use the data queue. In the usual case, certain data queues, as discussed below, are assigned to particular processes. The host software knows which data queue to use for a particular process. However, as indicated above, a single virtual FIFO can be used for multiple processes.

In a step 610, host processor 126 places data in the data queue that the host software has instructed to be used. For purposes of illustration, and referring again to FIG. 4, assume that the data queue being used for the discussion below is virtual FIFO(2) 408. Note that the associated control block for virtual FIFO(2) 408 is memory block 442. Also note that the discussion below applies to any virtual FIFO and not just virtual FIFO(2) 408.

Host processor 126 changes the end address in control addresses memory block 442 for data queue 408, this change is indicated by a block 612. DMA controller 404 then reads the new end address placed by the digital processor 126 into the control addresses memory block, as indicated by block 614. DMA controller 404 then reads commands and parameters from data queue 408. This step is indicated by a block 616.

Next, DMA controller 404 writes a new start address in the control block 442 each time it reads a block of data from virtual FIFO 408. Note that the DMA controller writes the new start address each time a block of data has been read. (See FIG. 8 for start address pointer strategy.) This is important in connection with context switching, discussed below. This step of writing a new start address is indicated by a block 618.

Finally, DMA controller 404 snoops the end address present in the control block of virtual FIFO 408. This is indicated by path 424 of FIG. 4. This step in FIG. 6 is indicated by a step 620. DMA controller 404 reads the end address in the memory block if it determines that it has been modified. As discussed below, this allows for context switching to occur on a relatively fast basis.

At any time, host processor 126 can place data into the data queue being used if there is space in the data queue. This indicated by a block 622, in FIG. 6. It is important to note that the host processor can place data at any time into the data queue. This increases systems throughput and response time. It also acts to reduce latency.

At any time, DMA controller 404 can remove data from the data queue being used as long as there is data available in the data queue. This is indicated by a block 624 in FIG. 6. Thus, peripheral device 401 can be provided with data from its associated data queue as long as there is data available. This acts to reduce latency.

When there is no data in a particular data queue, the start address and the end address stored in the control block will be the same. Referring now to FIG. 5, a preferred data structure for the data queues (virtual FIFOs) is shown. Referring to FIG. 5A, it shows that the data (labeled valid data) in the data queue begins at a memory location indicated by the start address, and ends at a higher numbered memory location indicated by the end address. The start address is indicated by a reference number 502, and the end address is indicated by a reference number 504. The start of data is indicated by a reference number 506, and the end of data is indicated by a reference number 508. As shown, the data is written in queue addresses beginning with a low address and going to a high address.

As discussed below, the DMA controller reads data starting at the start address, as indicated by a reference numeral 510. In contrast, as discussed below, host processor 126 adds data to the data queue beginning at end address 504, as indicated by a reference numeral 512.

In the example shown in FIG. 5A, the amount of valid data contained in the data queue and the physical location of this data is such that the data does not have to wrap around to the beginning of the data queue. In other words, the valid data does not extend over the top of the queue.

Figure 5B:
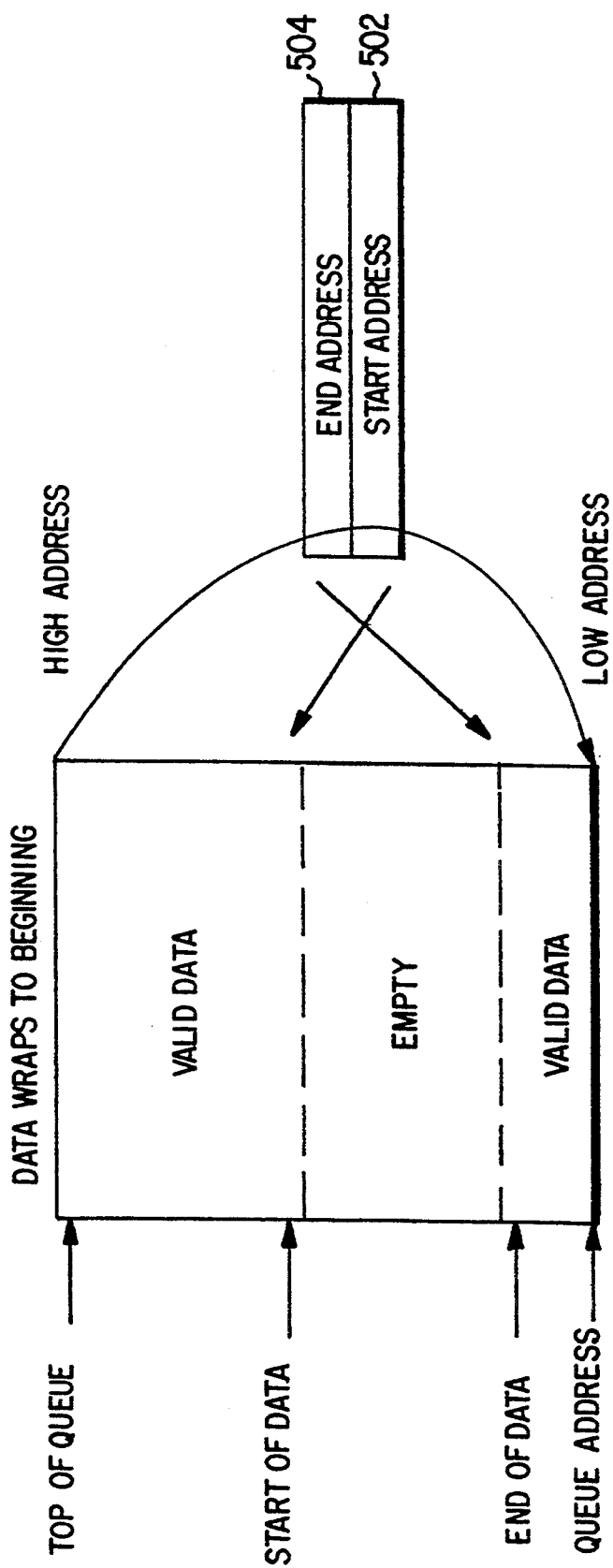
FIG. 5B shows a preferred virtual FIFO data structure in accordance with the present invention where data wraps to the beginning.
Figure 6:
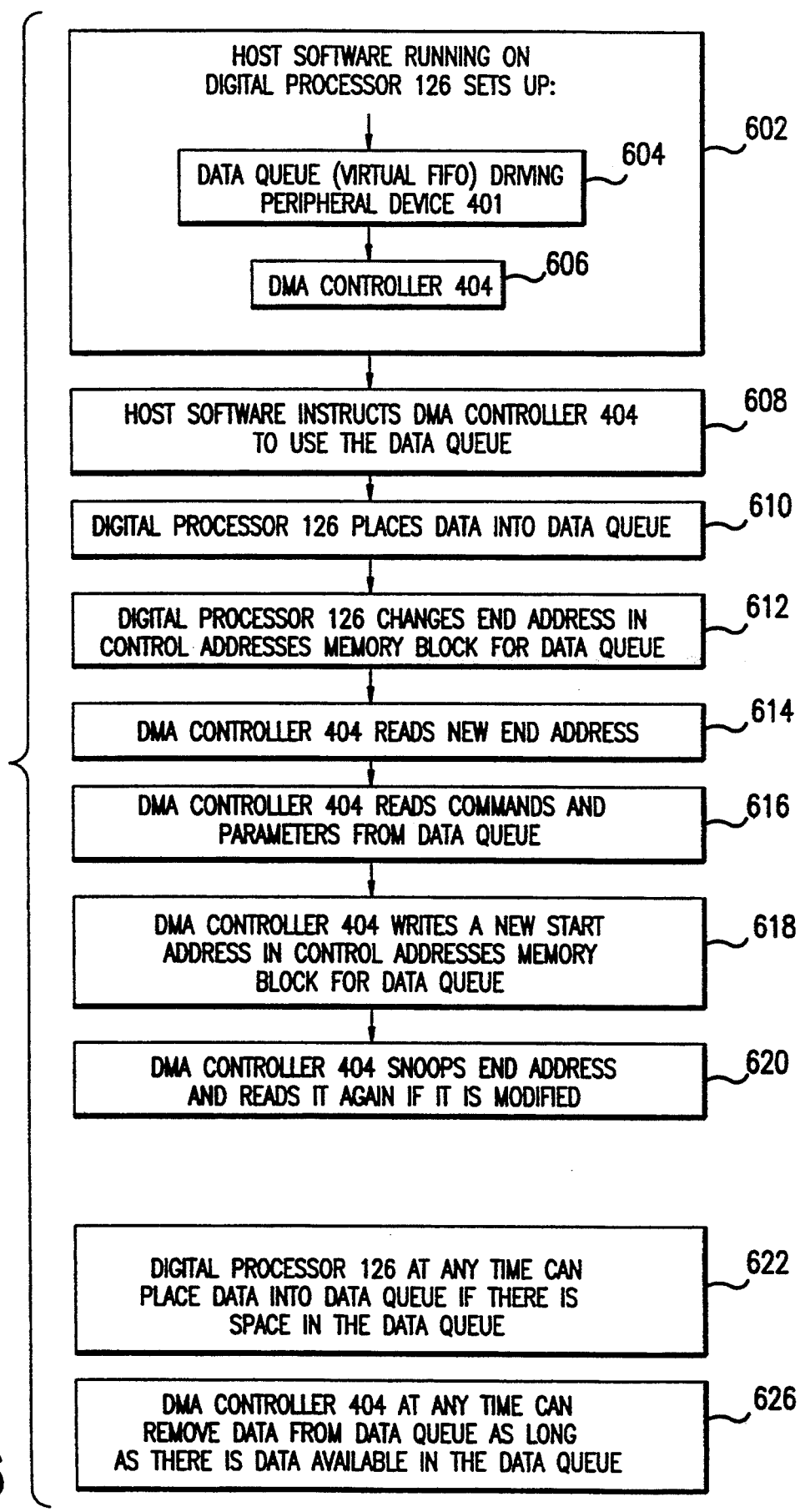
FIG. 6 is a flow chart showing at a high level the operation of the digital processor 126 under control of host software with the DMA controller 404 in accordance with the present invention.

FIG. 5B illustrates an example where the data wraps to the beginning of the data queue. Referring now to FIG. 5B, it is seen that start address 502 indicates that the start of the data is at a mid address in the data queue. This typically occurs after DMA controller 404 has read data out of the data queue. The valid data beginning at the summary location indicated by the start address 502 is written to the top of the queue, which has the high address for the queue. Since there is more valid data than can be accommodated, the additional data is written into the data queue beginning at the low address, and continuing up to the end of data, as indicated by the end address 504. It is thus seen in the example, that the data is wrapped around. This wrap around approach allows for host processor 126 and the DMA controller 404 to read data into and write data out of, respectively, the data queue at any time, as discussed above in connection with step 622 and 626. DMA controller 404 has logic incorporated to handle the queue wrap around addressing.

It should be understood that the present invention also can accommodate other software data structures for the virtual FIFOs. For example, the start address and end address approach of FIG. 5 could be utilized in a situation where the data is written from the high address to the low address, as opposed to the low address to the high address as shown in the example. In this way, the data would wrap around at the bottom as opposed to wrapping around at the top, as shown in the example at FIG. 5B. The important concept is the use of the start address 502 and the end address 504 indicating, respectively, the start of data and the end of data in the data structure of the data queue (virtual FIFO).

As stated, when the start pointer (indicated by the start address 502) reaches the top of the data queue, it is reset to the bottom of the data queue before the next data entry can be made into the data queue. The data queue wraps around to the bottom after reaching the top.

As shown in the example of FIG. 4, there are three data queues (virtual FIFOs) in main memory 102. This allows for context switching between processes being run by the host software to be performed by the present invention. Specifically, each process being run by the host software may have its own virtual FIFO (data queue). Thus, each process is not affected by the other processes.

In this way, relatively fast context switching can be performed by the present invention because the various processes may put data into their respective data queues even when the peripheral hardware is servicing another process through the virtual FIFO associated with the process being serviced. This acts to reduce latency significantly.

Referring to FIG. 4, context memory blocks 412, 414 and 416 located in main memory 102 hold state information associated with a context (process). Note that only three context memory blocks are shown. This is for illustration only. The present invention contemplates allocating any number of context memory blocks in main memory 102. When a context is switched the current context is read out of the virtual FIFO and stored in a context memory block 421. Subsequently, another context is loaded from memory into that particular virtual FIFO.

Typically, the virtual FIFO (data queue) is swapped when a context switch is performed by the host software operating on the digital processor 126. However, this does not necessarily have to take place. For example, if two processes are associated with the same data queue, such a swap would not take place. An instruction in the data stream would signal the hardware to synchronously switch contexts. A preferred embodiment would not flush the virtual FIFO. Instead, it would just continue reading the data stream. All the instructions ahead of the switch instruction would complete there operations. Subsequently, a set of instructions would be sent down the pipeline to start saving contexts as the different stages become idle. These operations are all synchronous. Thus, it should be understood that the present invention does not require that the data queues be swapped in order for context switching to be performed.

Referring now to FIG. 4, the hardware FIFO discards any data remaining in it when the context is switched. This can be done by the present invention since the data that is being discarded from hardware FIFO 402 is still in the virtual FIFO (data queue) associated with the process. This architecture of the present invention reduces the amount of state information which must be saved during context switches.

This functionality of the present invention is accomplished as follows. DMA controller 404 keeps (stores and maintains) two pointers associated with the start address. The first pointer (fetch pointer) specifies the memory location of the next data item in the data queue being used which is to be loaded into the data FIFO 402. DMA controller 404 also keeps a start pointer (start pointer), which specifies the memory location of the data item in the data FIFO 402 which is next to be read out to peripheral device 401 via a path 418.

The use of these two start pointers by DMA controller 404 allows hardware FIFO 402 to be flushed (that is, any data remaining in the hardware data queue 402 is discarded) when a context switch has been requested without reading the data remaining in hardware FIFO 402 into another memory buffer (not shown), or actually writing it back into the data queue of main memory 102. This acts to significantly decrease latency and system memory bandwidth during context switching in accordance with the present invention.

The end address written into memory holds the end of the data actually consumed by hardware FIFO 402. In other words, the end address written into memory is not the address of the last data item that was read into the hardware data FIFO 402.

It should be understood that the cost of this aspect of the present invention is that some data items remain in the virtual FIFO while it is actually in hardware FIFO 402 as well. When the particular process (context) is resumed, DMA controller 404 is loaded with the start pointer which holds the last unused data item that was read out to peripheral device 401.

Note that the pointers associated with a queue are saved when the queues are switched.

D. Context Buffer

As discussed above, the context (processes) are stored in the context memory locations 412, 414 and 416 when not in use.

The context may be copied, and restored from system memory buffers (Context No. 1–3), where they are stored when not in use. The buffers hold enough data to restart an interrupted context. Each process may have one or more contexts which may be swapped. The context is saved when an acceptable point in the data has been reached.

Peripheral devices 401 often require that certain sets of data be used together and that the context of the device may not be swapped unless the whole packet of data is received and handled in some way by the peripheral. If there are requirements of this type, the DMA device or the DMA controller will need to examine the output of the hardware FIFO to determine when context of the peripheral device may be switched.

E. Signaling Mechanisms

DMA controller 404 provides two signaling mechanisms in accordance with the present invention. As shown in FIG. 4, these are provided by path 430 from DMA controller 404 to the digital processor 126.

The first signaling mechanism provided by the DMA controller 404 is interrupts. The second is status, which is poling (reading a status register and testing the contents) by host processor 126 of the DMA controller 404.

It should be noted that host processor 126 may enter a "signal" primitive into the data queue which generates an interrupt to the digital processor 126. Host processor 126 may use this primitive to synchronize the software to operations in the hardware.

F. Pointer Control Strategy

The FIFO pointers shown in FIG. 5 used in the present invention are jointly managed by host processor 126 and DMA controller 404. It should be noted that these pointers do not have to be exactly current in accordance with the present invention. System efficiency will be higher if the pointers are updated only when necessary. The present invention contemplates and takes advantage of this. Note that the sizes of the virtual FIFOs in the system memory 102, and the data FIFO (hardware) 402 and the amount of data required for proper operation of the peripheral device 401 must be taken into account when controlling these pointers.

Host processor 126 initializes start address 502, but manages end address 504. DMA controller 404 initializes end address 504, but manages start address 502. In other words, the host processor 126 is the writer of the start address, while the peripheral processor 401 (or DMA controller 404) is the reader. The peripheral processor 401 (or DMA controller 404) is the writer of the end address, while the host processor 126 is the reader. Each time a start address pointer or an end pointer is modified in the control addresses memory block in the system memory 102, the reader of the particular pointer may read it. This is important for control in the present invention.

In order to save bandwidth in both writing and reading of the start and end address pointers, the following strategies discussed below in connection with FIGS. 7 and 8 can be used in accordance with the present invention:

The start address pointer strategy is as follows:
1. The start address is updated if the amount of data left in the virtual FIFO is less than the maximum increment which is fetched from the virtual FIFO in a transaction, as indicated by a block 802. This keeps the memory bandwidth efficient.
2. The start address is updated if the context is switched, as indicated by a block 804;
3. The start address is updated if the data FIFO (queue) 402 is empty, as indicated by a block 806;
4. The start address is updated if the amount of data read from the data FIFO (queue) 402 since the last time the start address was updated is large (for example, one quarter of the depth of the data queue), as indicated by a block 810.
5. If requested by the host processor the start address can be updated. For example, the host processor might request an update if the virtual FIFO is empty and the start address pointer was pointing at a address that is different from the address of where the host processor has started loading the data.

The end address pointer strategy is as follows:
1. The end address is not updated if only part of an indivisible operation has been entered into the virtual FIFO (queue) in memory, as indicated by block 702. This prevents the peripheral device 401 from starting an indivisible operation(s) in the middle. In other words, if the end pointer can only point to the end of indivisible operations, DMA 404 will not feed operations which are not complete to peripheral 401. This strategy also prevents system lock-up if the writing process in the digital processor 126 is suspended before completing the entry into the virtual FIFO (queue).
2. The end address is written into the memory block (updated) if (1) the stream of data is complete, as indicated by a block 704; or (2) if a large block of data (for example, one-fourth of the depth of the data queue) has been written into the virtual FIFO since the last time the end address was updated as indicated by a block 706.
3. If virtual FIFO is full (no space available) then the end address pointer is updated so that the hardware can do maximum fetching.

The end address should always be updated so divisible operations to the hardware are maintained between the start and end pointers.

It should be understood, however, that the present invention is not limited to this strategy for updating the data pointers. Any suitable strategy for updating the data pointers is contemplated by the present invention.

G. Variations And Alternate Embodiments In The System And/Or Method

Figure 9:
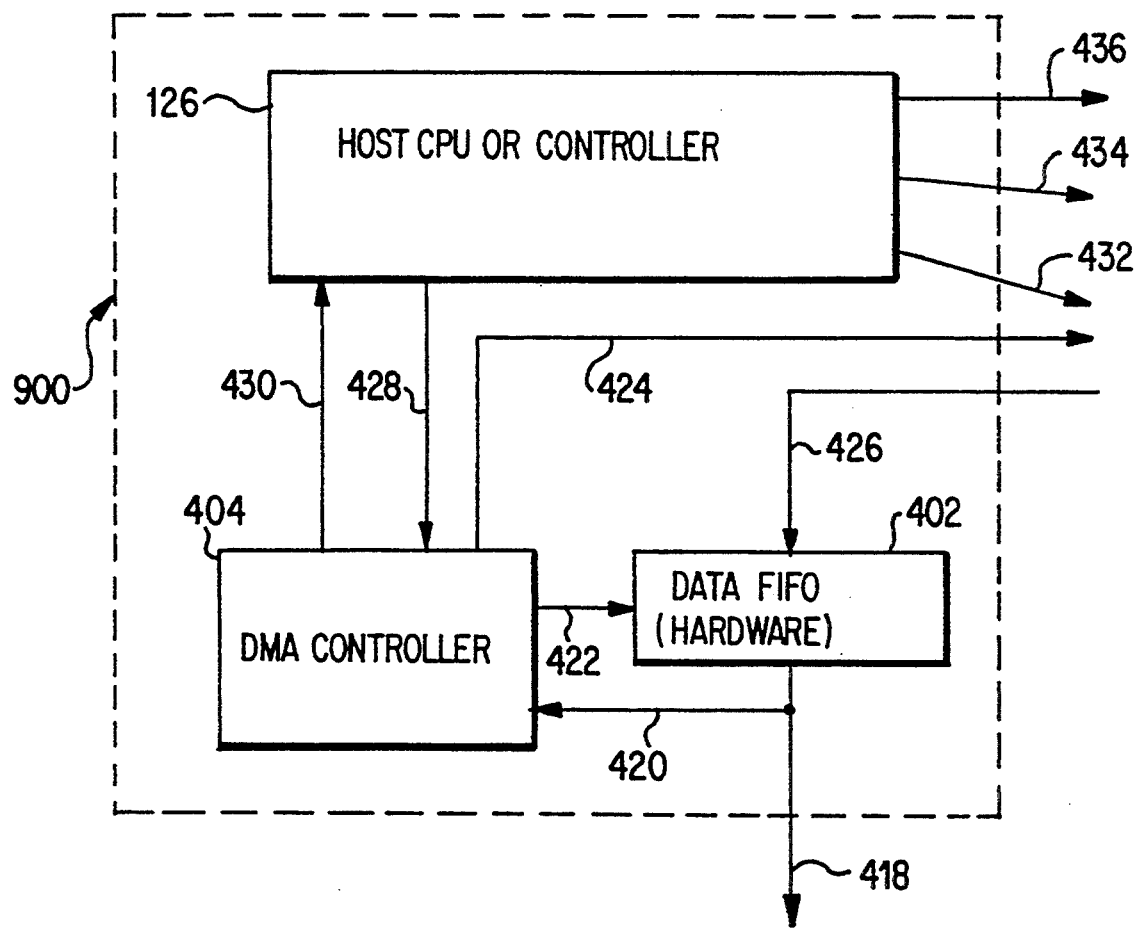
FIG. 9 is a block diagram representation showing an alternate embodiment of the present invention where host processor 126, the DMA controller 404, and hardware FIFO 402 are all fabricated on a single (microelectronic device) semiconductor chip 900.

In one alternate embodiment, host processor 126, DMA controller 404, and hardware FIFO 402 can all physically be present on a single microelectronic device 900, as indicated in block diagram form in FIG. 9. As shown in FIG. 9, the various data and control lines between these three functional blocks can be fabricated as part of the single microelectronic device, and an input/output stage can provide the necessary control and data paths between these three functional blocks and main memory 102, peripheral device 404, and the like.

It should be understood that any suitable type of fabrication technology and process can be used for implementing this alternate embodiment of the present invention.

Figure 10:
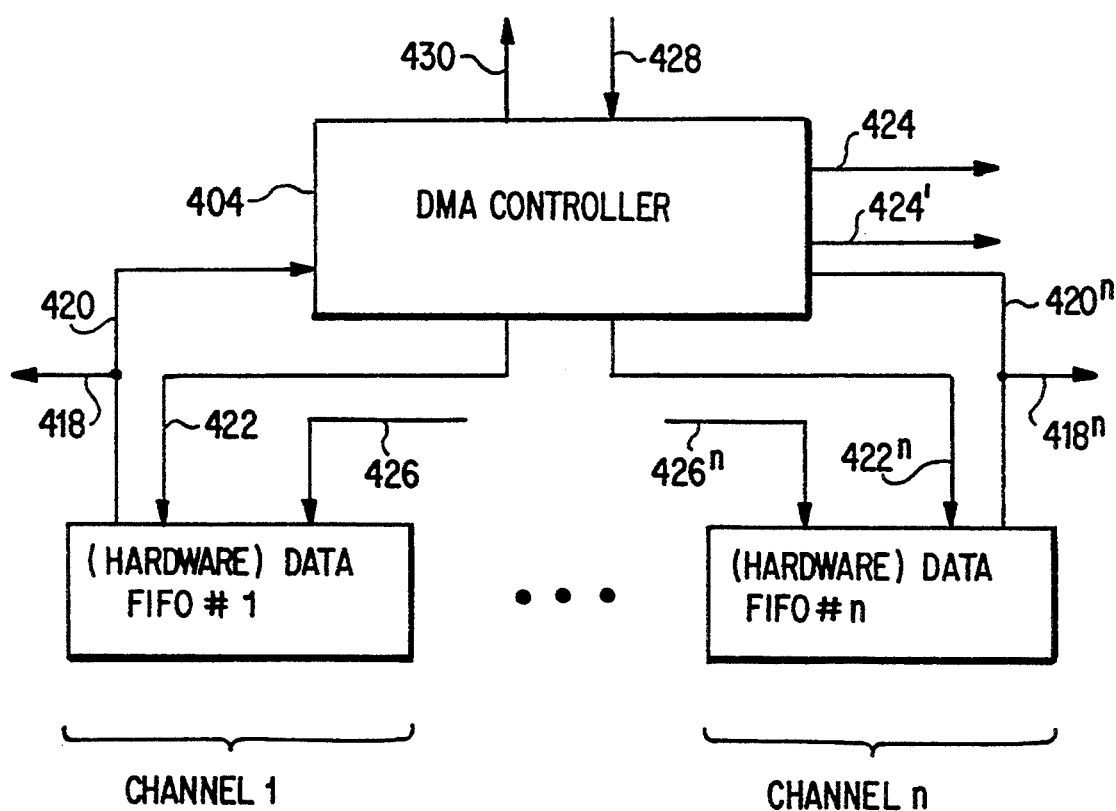
FIG. 10 is a block diagram showing an embodiment of the present invention where the DMA controller 404 controls n (hardware) data FIFOs, where n is a positive integer greater than or equal to 2, which creates n channels.

DMA controller 404 can be used to control two or more channels. Referring now to FIG. 10, DMA controller 404 can control n channels, where n is a positive integer $\geq$ than 2. Each channel has an associated peripheral device $401^n$. Each peripheral $401^n$ has an associated hardware FIFO n, which is filled up from main memory 102 (or other memories) under control of DMA controller 404.

It should be understood that hardware FIFOs n in this embodiment can either be part of a single microelectronic device which also has DMA controller 404, or can be physically separated from DMA controller 404.

This embodiment is particularly useful in a situation where multiple peripheral devices, for example, are being used to store very large amounts of data under control of a single DMA controller 404. It could also be useful in a graphics processor situation where the graphics processor would be capable of operating on two or more processes (context) or multiple communications channels (e.g., multiple network interfaces) at the same time.

Figure 11:
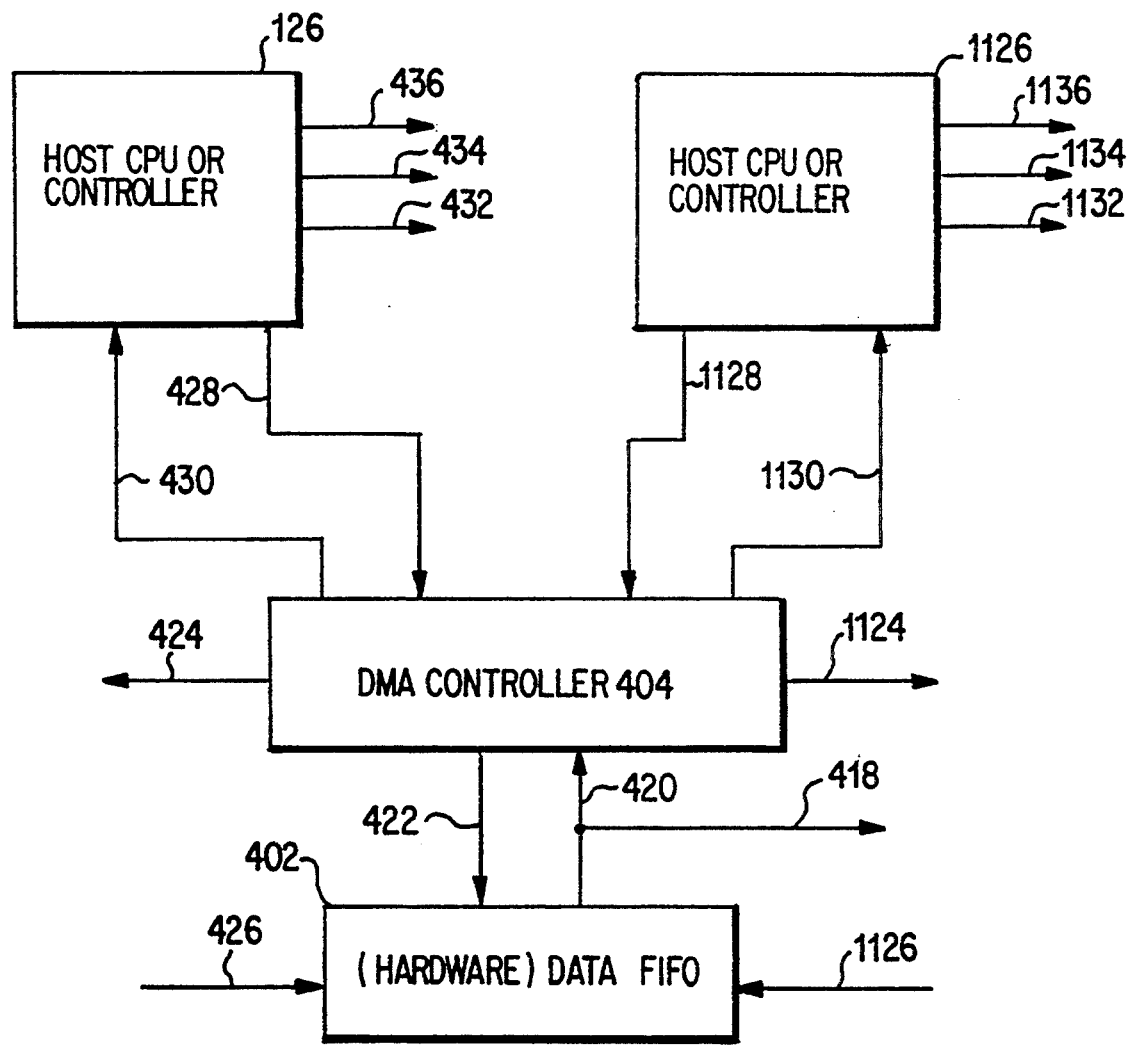
FIG. 11 is a block diagram showing an embodiment utilizing two host CPUs for controlling the DMA controller 404 and the (hardware) data FIFO 402.

The present invention also contemplates an embodiment where two or more digital processors are controlling DMA controller 404. Referring now to FIG. 11, DMA controller 404 is controlled by host processor 126, and also by a second host processor 1126. (Note that the numbering used in FIG. 11 shows the corresponding blocks and lines between the two digital processors as indicated by the right two-most digits of the reference number; for example, host processor 1126 is comparable to the host processor 126).

Note that as shown in FIG. 11, each host processor is controlling its own system memory: system memory 102 for host CPU 126, and a system memory 1102 (not shown) for host CPU 1126. Data from each of these memories in the virtual FIFOs in these memories is provided to the (hardware) data FIFO 402 by lines 426 and 1126, respectively. In this way, hardware FIFO 402 can be supplied with data under control of each of the host CPUs 126 and 1126.

As is well known, any control scheme can be utilized between host CPU 126 and host CPU 1126 so that they are not asking DMA controller 404 and hardware FIFO 402 to operate on their data at the same time.

An alternate embodiment associated with FIG. 11 is to have host CPU 126 being provided with data directly by another host CPU (not shown). This would be particularly advantageous in a graphics situation where the other host CPU would be working on or retrieving data for host CPU 126 in a background mode. This data would then be provided to host CPU 126 after it had been generated, or had been fetched.

Thus, it should be understood that the present invention contemplates embodiments utilizing two or more host CPUs, either directly controlling DMA controller 404, or cascaded with respect to each other.

Figure 12:
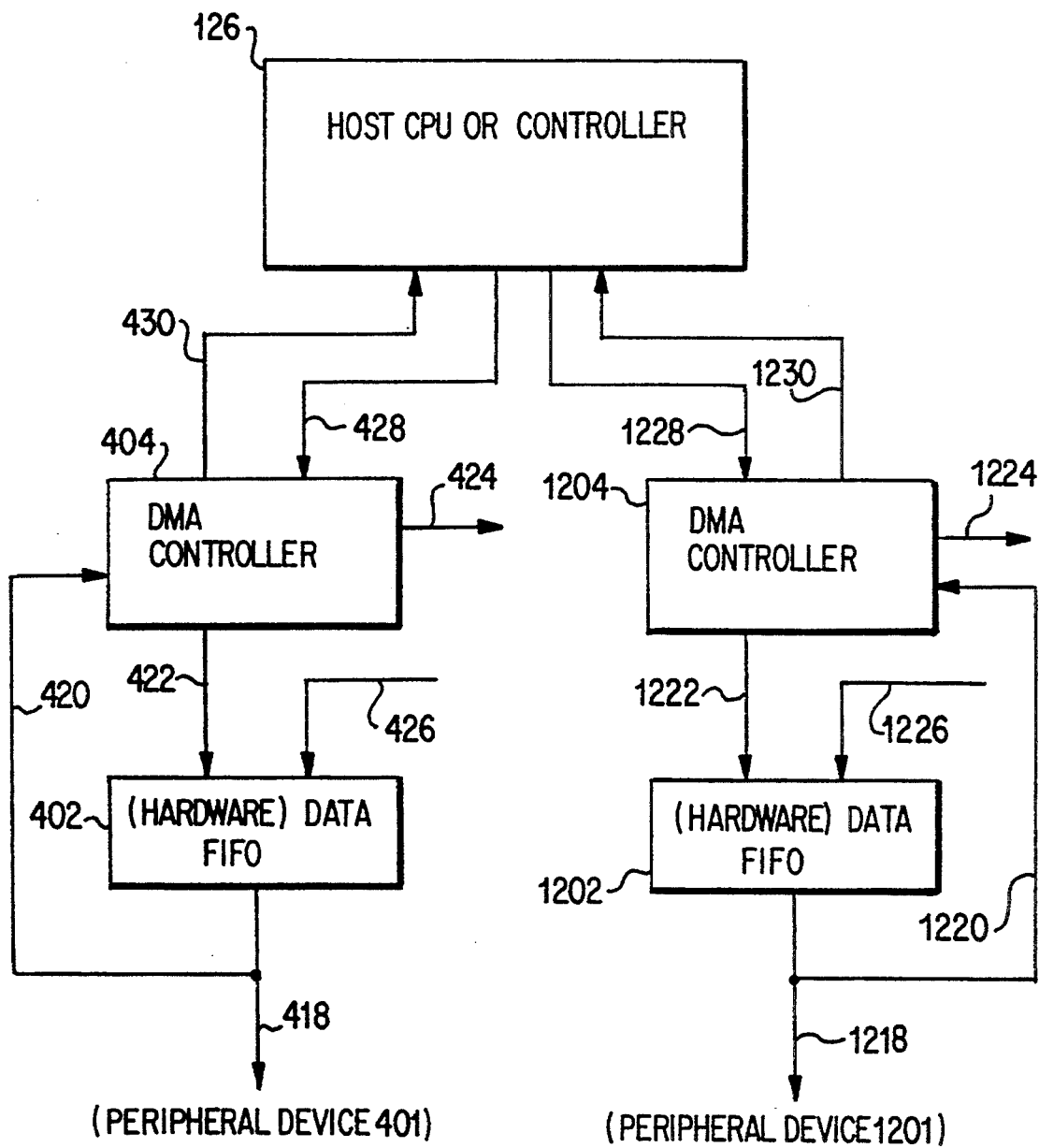
FIG. 12 is a block diagram of an alternate embodiment of the present invention using a single host CPU 126 to control two or more DMA controllers with associated (hardware) data FIFOs.

The present invention also contemplates an embodiment where a single digital processor having a single host CPU 126 controls two or more DMA controllers with associated (hardware) data FIFOs. An example of this embodiment is shown in block diagram form in FIG. 12. As shown, there are two DMA controllers: DMA controller 404 and DMA controller 1204. [Note, the numbering convention used in FIG. 12 indicates similar block diagrams and lines by the same right two-most digits; for example, DMA controller 1204 is similar in structure and operation to the DMA controller 404.]

Thus, a single host processor 126 can control the operation of two peripheral devices 401 and 1201, each under control of its respective DMA controller 404, 1204.

As shown in FIG. 11, there are two streams of data that are being supplied to hardware FIFO 402: stream 426 and stream 1126. DMA controller 404 can keep track of these streams of data in the single hardware FIFO using either tags or other identification strategy. The present invention contemplates an embodiment where hardware FIFO 402 is provided with two or more streams of data, as opposed to being limited to only those embodiments where each hardware FIFO only has a single stream of data. Tagging or other suitable identification can be used by DMA controller 404 to identify from which stream the particular data has come.

Typically, the main memory 102 is the main memory of the digital processor. However, the present invention can also be utilized in situations where there is no direct access to the main memory 102.

Figure 13:
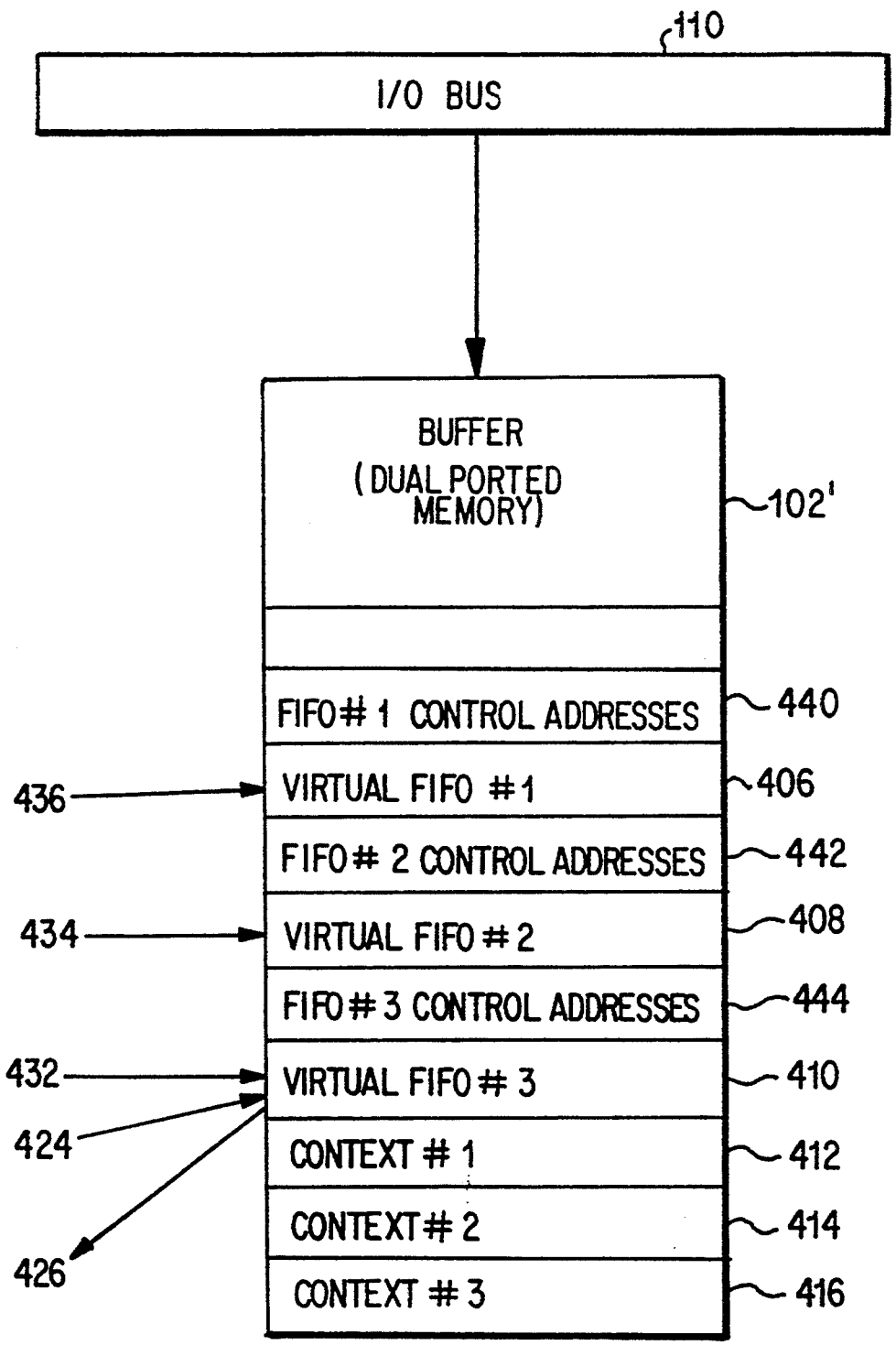
FIG. 13 is a block diagram showing an alternate embodiment where a buffer (dual ported memory) is on the I/O bus 110 so as to allow the present invention to be utilized with a personal computer product where the I/O bus cannot accommodate direct memory access.

An embodiment which allows the present invention to be implemented where direct access to the main memory 102 is not possible is shown in FIG. 13. A buffer (also denominated a dual ported memory) 102' has one port connected directly to the I/O bus 110. The host CPU 126, DMA controller 404 and the hardware FIFO 402 (all of which are not shown in FIG. 13) obtain access to the virtual FIFOs, and the associated control addresses via the lines indicated by the series 400 numbers.

Note that buffer 102' could be a single ported memory, where both the host processor and DMA controller 404 could gain access to the data and other information stored in it. However, the preferred embodiment is that of a dual ported memory.

This embodiment, shown in FIG. 13, is particularly advantageous in some personal computer environments. In such situations, the present invention is sitting on I/O bus 1110, but cannot be a bus master. For example, on the IBM AT Class personal computer machines, there is no direct memory access by peripherals, other than the standard internal DMA controller which does not support the virtual FIFO functionality, like there is on some of the newer, more robust architectures. The present invention therefore can overcome this deficiency without modification to the PC machine itself.

H. Conclusion

Thus, it is seen that the present invention allows for relatively rapid swapping of peripheral device contexts. It also presents the appearance of multiple FIFOs to the host software. The software generating the data to be presented to peripheral device 401 need not be concerned that other devices are also using peripheral device 401. Multiple "client" processes, for example, can time multiplex the use of a hardware peripheral device 401, but continue to create data and commands and place them into their "virtual FIFO's" until the virtual FIFO's are full.

Finally, the present invention allows very large data queues to be created with very modest hardware cost and with very modest use of memory bandwidth.

While the invention has been particularly shown and described with reference to preferred embodiments thereof, it will be understood by those skilled in the art that various changes in form and details may be made therein without departing from the spirit and scope of the invention.

What is claimed is:

1. A virtual FIFO peripheral interface system for use with a host processor and a peripheral processor in connection with queuing, control and transfer of data from the host processor to a peripheral, comprising:
    (a) at least one virtual FIFO data structure located in a main memory;
    (b) a control addresses block associated with each of said at least one virtual FIFO data structure;
    (c) a hardware FIFO, coupled to said virtual FIFO data structure, and controlled by the peripheral processor, which supplies data to the peripheral;
    (d) a direct memory access (DMA) controller, coupled to said hardware FIFO and the host processor, which controls the data transfer from said at least one virtual FIFO data structure to the peripheral processor;
    (e) wherein said control address block includes a start address pointer and an end address pointer, wherein said start and end address pointers indicate the memory location in said associated virtual FIFO data structure where information is stored, said start address pointer and said end address pointer are managed jointly by the host processor and said DMA controller; and
    (f) means for updating said start address pointer in said control address block according to the following protocol:
        (i) updating said start address pointer if the amount of data left in said virtual FIFO data structure is less than the maximum increment which can be fetched from said virtual FIFO data structure in a single memory transaction;
        (ii) updating said start address pointer if the context is switched in said associated virtual FIFO data structure;
        (iii) updating said start address pointer if said hardware FIFO is empty;
        (iv) updating said start address pointer if the amount of data read from said hardware FIFO since the last time said start address pointer was updated is substantially large; and
        (v) updating said start address pointer if requested by the host processor.

2. The system of claim 1, wherein the host processor controls means for loading data into each of said at least one virtual FIFO data structure.

3. The system of claim 1, wherein said hardware FIFO is physically located on the same chip as the peripheral processor.

4. The system of claim 1, wherein the peripheral processor includes a read address pointer which points to the last unused data read out of said hardware FIFO to the peripheral processor.

5. The system of claim 1, wherein the storage capacity of said hardware FIFO is substantially smaller than said virtual FIFO data structure.

6. The system of claim 1, wherein the peripheral processor is a graphics processor, and wherein said graphics processor includes said DMA controller and said hardware FIFO.

7. The system of claim 1, wherein the host processor contains a host software means for initializing said virtual FIFO data structure and said DMA controller.

8. The system of claim 1, wherein said DMA controller contains a fetch pointer which specifies the memory location of the next data item in said virtual FIFO data structure to be loaded into said hardware FIFO and a start pointer which specifies the memory location of the data item in said hardware FIFO which is next in line to be read by the peripheral processor.

9. The system of claim 1, wherein said main memory includes at least one context memory block for storing information concerning the contexts currently operating in the peripheral processor.

10. The system of claim 1, further comprising means for updating said end address pointer.

11. The system of claim 1, wherein said hardware FIFO provides data to a first of n channels, and further comprising n−1 additional hardware FIFOs, coupled to said DMA controller, for providing data to the other respective n−1 channels, where n is an integer greater than 1.

12. The system of claim 1, wherein said host processor comprises a first host processor, and further comprising at least one additional host processor cascaded with said first host processor for providing data to said first host processor.

13. The system of claim 1, further comprising at least one additional parallel host processor directly connected to said DMA controller.

14. The system of claim 1, further comprising at least one additional DMA controller coupled to said host processor for controlling the transfer of data from said host processor to an associated hardware FIFO which holds said transferred data for an associated peripheral.

15. A method for transferring information between a host processor and a peripheral processor, comprising the steps of:
(1) initializing a set of virtual FIFO data structures and associated control addresses blocks located in a main memory, each of said associated control addresses blocks having start and end address pointers, and initializing a direct memory access (DMA) controller, said DMA controller being coupled to a host processor and a hardware FIFO;
(2) selecting one of said virtual FIFO data structures and instructing said DMA controller to use said selected virtual FIFO data structure;
(3) storing information in said selected virtual FIFO data structure and changing an end address pointer located in said control addresses block associated with said selected virtual FIFO data structure to correspond to said stored information;
(4) transferring data from said selected virtual FIFO data structure into a hardware FIFO;
(5) updating said start address pointer located in said control addresses block associated with said selected virtual FIFO data structure according to the following protocol:
(i) updating said start address pointer if the amount of data left in said virtual FIFO data structure is less than the maximum increment which can be fetched from said virtual FIFO data structure in a single memory transaction;
(ii) updating said start address pointer if the context is switched in said associated virtual FIFO data structure;
(iii) updating said start address pointer if said hardware FIFO is empty;
(iv) updating said start address pointer if the amount of data read from said hardware FIFO since the last time said start address pointer was updated is substantially large; and
(v) updating said start address pointer if requested by the host processor; and
(6) transferring data from said hardware FIFO to the peripheral processor;
wherein said DMA controller is configured for reading said end address pointer in said control addresses block associated with said selected virtual FIFO data structure and writing a new start address into said start address pointer located in said control addresses block associated with said selected virtual FIFO data structure.

16. The method of claim 15, further comprising the steps of snooping said end address pointer and reading said end address pointer if it has been modified.

17. The method of claim 15, further comprising the step of updating said end address pointer located in said control addresses block associated with said selected virtual FIFO data structure according to the following protocol:
(i) not updating said end address pointer if only part of an indivisible operation has been entered into said associated virtual FIFO data structure;
(ii) updating said end address pointer if the stream of data is complete;
(iii) updating said end address pointer if a substantially large block of data has been written into said virtual FIFO data structure since the last time said end address pointer was updated; and
(iv) updating said end address pointer if said virtual FIFO data structure is full.

18. The system of claim 17, wherein said first DMA controller is connected to a first hardware FIFO, and the system further comprising a second DMA controller, said second DMA controller connected to a second hardware FIFO.

19. A virtual FIFO peripheral interface system for use with a host processor and a peripheral processor in connection with queuing, control and transfer of data from the host processor to a peripheral, comprising:
(a) at least one virtual FIFO data structure located in a main memory;
(b) a control addresses block associated with each of said at least one virtual FIFO data structure;
(c) a hardware FIFO, coupled to said virtual FIFO data structure, and controlled by the peripheral processor, which supplies data to the peripheral;

(d) a direct memory access (DMA) controller, coupled to said hardware FIFO and the host processor, which controls the data transfer from said at least one virtual FIFO data structure to the peripheral processor;
(e) wherein said control address block includes a start address pointer and an end address pointer, wherein said start and end address pointers indicate the memory location in said associated virtual FIFO data structure where information is stored, said start address pointer and said end address pointer are managed jointly by the host processor and said DMA controller; and
(f) means for updating said end address pointer in said control address block according to the following protocol:
  (i) not updating said end address pointer if only part of an indivisible operation has been entered into said associated virtual FIFO data structure;
  (ii) updating said end address pointer if the stream of data is complete;
  (iii) updating said end address pointer if a substantially large block of data has been written into said virtual FIFO data structure since the last time said end address pointer was updated; and
  (iv) updating said end address pointer if said virtual FIFO data structure is full.

20. The system of claim 19, wherein said DMA comprises a snooping means for snooping said control addresses block for a change in said end address pointer.

21. A method for transferring information between a host processor and a peripheral processor, comprising the steps of:
(1) initializing a set of virtual FIFO data structures and associated control addresses blocks located in a main memory, each of said associated control addresses blocks having start and end address pointers, and initializing a direct memory access (DMA) controller, said DMA controller being coupled to a host processor and a hardware FIFO;
(2) selecting one of said virtual FIFO data structures and instructing said DMA controller to use said selected virtual FIFO data structure;
(3) storing information in said selected virtual FIFO data structure and changing an end address pointer located in said control addresses block associated with said selected virtual FIFO data structure to correspond to said stored information;
(4) transferring data from said selected virtual FIFO data structure into a hardware FIFO;
(5) updating said end address pointer located in said control addresses block associated with said selected virtual FIFO data structure according to the following protocol:
  (i) not updating said end address pointer if only part of an indivisible operation has been entered into said associated virtual FIFO data structure;
  (ii) updating said end address pointer if the stream of data is complete;
  (iii) updating said end address pointer if a substantially large block of data has been written into said virtual FIFO data structure since the last time said end address pointer was updated; and
  (iv) updating said end address pointer if said virtual FIFO data structure is full; and
(6) transferring data from said hardware FIFO to the peripheral processor;
wherein said DMA controller is configured for reading said end address pointer in said control addresses block associated with said selected virtual FIFO data structure and writing a new start address into said start address pointer located in said control addresses block associated with said selected virtual FIFO data structure.

* * * * *